US008166921B2

(12) United States Patent
Biggs

(10) Patent No.: US 8,166,921 B2
(45) Date of Patent: May 1, 2012

(54) MARGINALS AQUARIUM PLANT SYSTEM

(76) Inventor: Devin S. Biggs, Madison, WI (US)

( * ) Notice: Subject to any disclaimer, the term of this patent is extended or adjusted under 35 U.S.C. 154(b) by 352 days.

(21) Appl. No.: 12/418,084

(22) Filed: Apr. 3, 2009

(65) Prior Publication Data

US 2009/0250011 A1  Oct. 8, 2009

Related U.S. Application Data

(60) Provisional application No. 61/072,988, filed on Apr. 4, 2008.

(51) Int. Cl.
*A01G 9/02* (2006.01)
(52) U.S. Cl. ......................................................... 119/246
(58) Field of Classification Search .................. 47/41.01, 47/41.11, 41.12, 44–47, 59 R, 63, 65.5, 65.7, 47/66.6, 66.7, 67, 69, 79, 904; 119/246, 119/247, 248
See application file for complete search history.

(56) References Cited

U.S. PATENT DOCUMENTS

| | | | |
|---|---|---|---|
| 2,531,562 A | | 11/1950 | Eve |
| 3,374,770 A | * | 3/1968 | Freudenberger .............. 119/252 |
| 3,477,679 A | * | 11/1969 | Lovitz ........................ 248/213.2 |
| 4,114,316 A | | 9/1978 | Cohen |
| 4,382,348 A | | 5/1983 | Kitsu et al. |
| 4,499,688 A | * | 2/1985 | Droll ................................. 47/83 |
| 4,622,775 A | | 11/1986 | Glenn et al. |
| 4,788,938 A | * | 12/1988 | Davenport .................... 119/246 |
| 4,820,556 A | | 4/1989 | Goldman et al. |
| 4,903,432 A | | 2/1990 | Velagaleti et al. |
| 5,018,332 A | * | 5/1991 | Ying-Kit ........................ 52/666 |
| 5,435,511 A | * | 7/1995 | Hsu ............................. 248/206.3 |
| 5,451,443 A | | 9/1995 | Wechsler |
| D368,556 S | * | 4/1996 | Rodgers ...................... D30/106 |
| 5,618,428 A | | 4/1997 | Oslund |
| 5,640,929 A | | 6/1997 | Malone |
| 5,957,084 A | | 9/1999 | Knepp |
| 6,014,838 A | | 1/2000 | Asher |
| 6,029,605 A | | 2/2000 | Licata |
| 6,119,393 A | | 9/2000 | Wourms et al. |
| 6,557,297 B2 | | 5/2003 | Receveur |
| 6,618,989 B2 | | 9/2003 | Hirose |
| 6,625,927 B2 | | 9/2003 | Woodruff |
| 6,751,903 B2 | | 6/2004 | Shryock |
| 6,786,002 B2 | | 9/2004 | Prescott |
| 6,843,021 B1 | | 1/2005 | Huang |
| 6,918,206 B2 | | 7/2005 | Schuck |
| D525,396 S | * | 7/2006 | Salvati et al. ................ D30/106 |
| 7,587,860 B1 | * | 9/2009 | Ilyas et al. ......................... 47/70 |
| 2003/0208954 A1 | | 11/2003 | Bulk |
| 2004/0065009 A1 | * | 4/2004 | Woodruff ....................... 47/65.5 |
| 2004/0187418 A1 | | 9/2004 | Day et al. |

(Continued)

FOREIGN PATENT DOCUMENTS

| | | |
|---|---|---|
| DE | 3800207 A1 | 7/1989 |
| JP | 10113685 A | 5/1998 |
| JP | 11289893 | 10/1999 |
| JP | 2001128588 A | 5/2001 |
| JP | 2004008125 A | 1/2004 |

(Continued)

*Primary Examiner* — Kimberly Berona
*Assistant Examiner* — Ebony Evans
(74) *Attorney, Agent, or Firm* — Charles S. Sara, Esq.; DeWitt, Ross & Stevens, S.C.

(57) ABSTRACT

A marginals aquarium planting system includes a hanging planter and at least one disc-like trellis raft floating in front of the hanging planter. The trellis raft is comprised of sections of closed-cell foam that form an asymmetrical latticework. The system can also include supplementary floats.

8 Claims, 17 Drawing Sheets

U.S. PATENT DOCUMENTS

2005/0044788 A1   3/2005   Tang et al.
2006/0230676 A1*  10/2006  Rowe et al. .................... 47/66.6
2007/0227066 A1*  10/2007  Crawford ....................... 47/65.5
2008/0197255 A1   8/2008   Bergevin
2010/0319080 A1*  12/2010  Amasino et al. ............. 800/260

FOREIGN PATENT DOCUMENTS

| JP | 2005295835 A | 10/2005 |
| JP | 2006271355 A | 10/2006 |
| WO | WO2008/002736 A2 | 1/2008 |

* cited by examiner

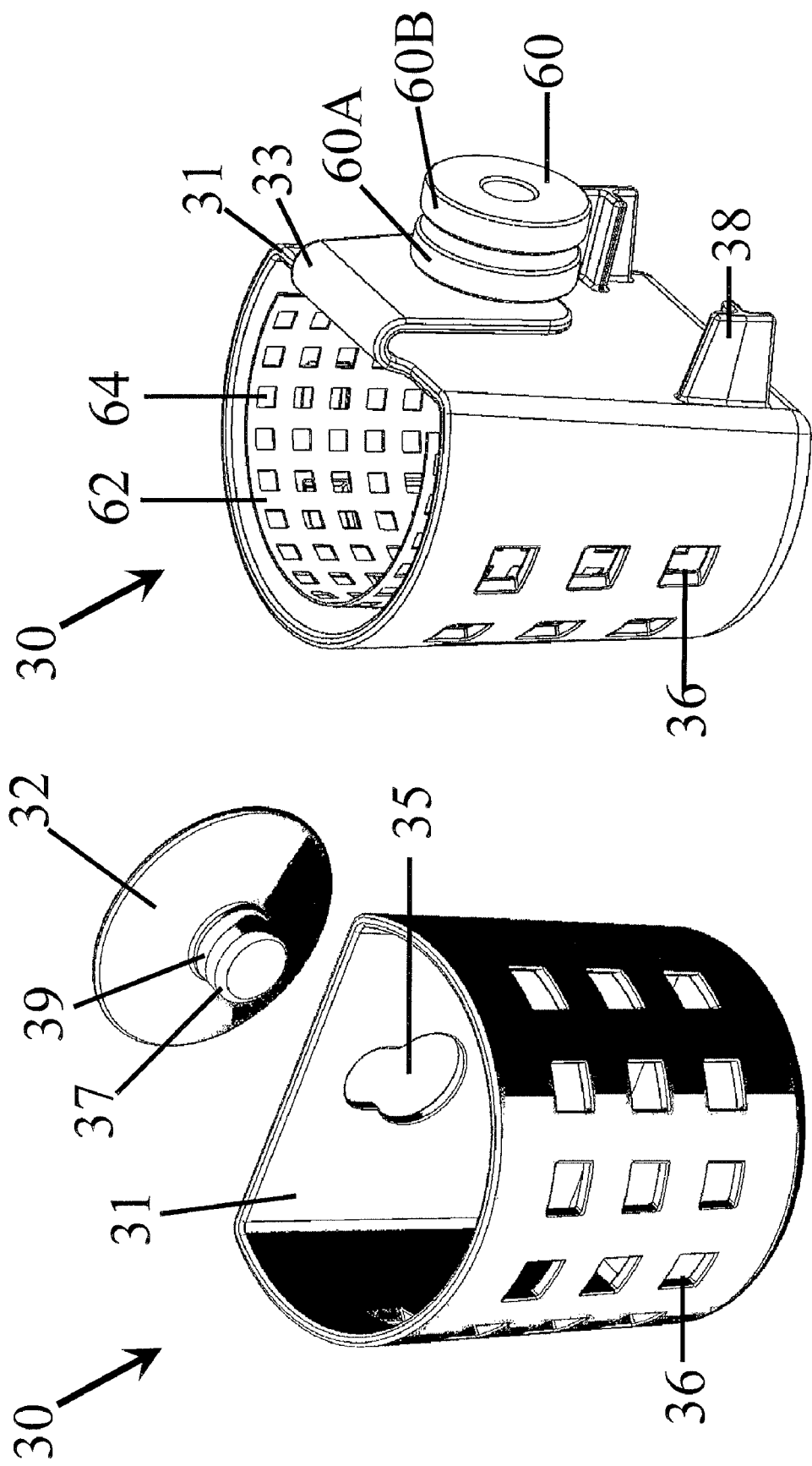

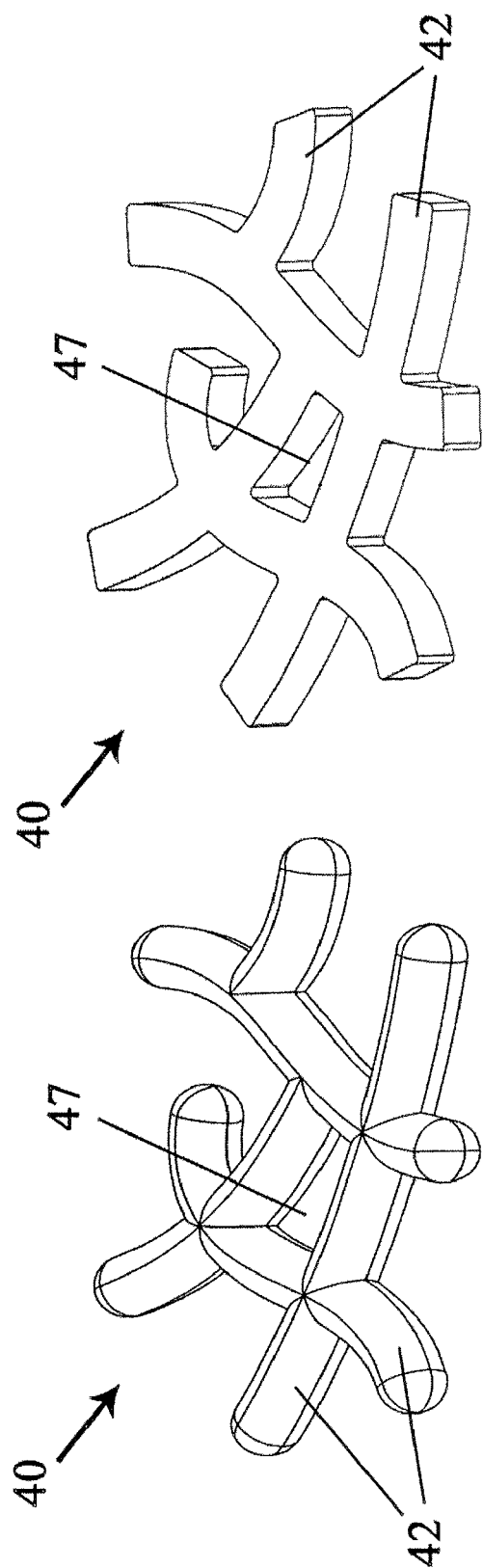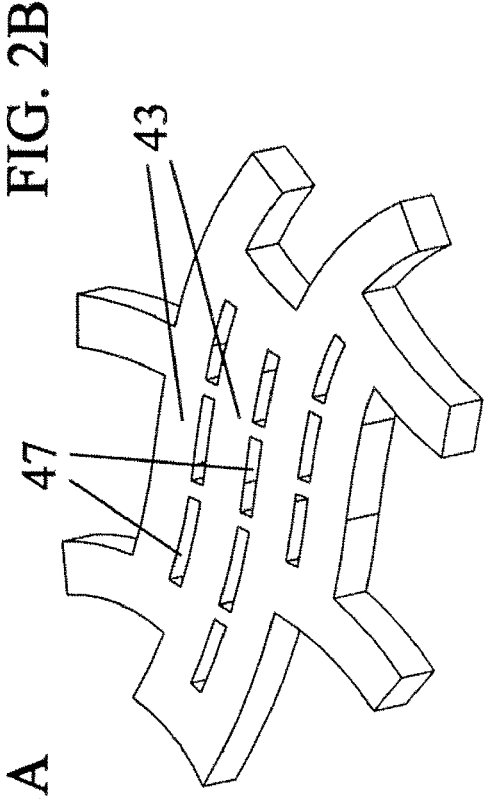

MARGINALS AQUARIUM PLANT SYSTEM

REFERENCE TO RELATED APPLICATION

The application claims priority to U.S. Provisional Application entitled "MARGINALS AQUARIUM PLANTING SYSTEM," Ser. No. 61/072,988, filed Apr. 4, 2008, which is incorporated herein by reference in its entirety.

FIELD OF THE INVENTION

This invention is directed to planting systems in general and specifically systems for maintaining marginal plants in planted aquariums.

DESCRIPTION OF THE PRIOR ART

Freshwater planted aquaria constitute a popular area of the aquarium hobby. With some skill, practice, and knowledge a hobbyist can create a beautiful display with live aquatic plants. Such systems serve as educational models of real ecosystems, while also providing perfect habitats for fish and other aquarium livestock. Hundreds of species of aquatic plants are suitable for culture in aquariums, many of which have unique strategies of growth and reproduction. Distinct schools of planted aquarium design have emerged through the efforts of hobbyists. These include Dutch style aquariums, which emulate the orderly groupings of plants in European gardens, and nature aquariums, inspired by carefully-contemplated Japanese gardens and natural landscapes. Since these types of planted aquaria showcase underwater plant growth, they are filled with water to the top of the aquarium. By contrast, a terrarium/aquarium hybrid, the paludarium, features a pool in the foreground and a terrestrial area in the background built with synthetic foam, rocks, or driftwood. Both the water feature and the terrestrial area in a paludarium can be adorned with live plants.

In addition to the glass aquarium enclosure and life-support equipment (e.g., lights, heaters, and filters) used in any aquarium display, planted tank enthusiasts also make use of specialized aquarium gardening technologies. These include aquatic plant substrates made of clay gravel, aquatic plant fertilizers, and carbon dioxide injection equipment. The last of these is required as a means of restoring dissolved carbon dioxide, a vital plant nutrient, as it is depleted from the water by the growing aquarium plants.

The system described herein is intended to address the particular challenges of maintaining marginal plants in a planted aquarium. Marginal plants constitute a subset of aquatic plants and include species that grow where water meets land at the edges of ponds, streams, lakes and rivers. Most marginal plants are rooted in saturated soil at the very edge of the water and extend their foliage in the air. The emmersed (above water) growth of marginal plant foliage is in contrast to the growth of fully aquatic species, the stems and leaves of which develop in the immersed (underwater) state. The marginal plant flora include popular garden pond specimens, such as spider lilies (*Hymenocallis* sp.), Mexican petunias (*Ruellia brittoniana*), rain lilies (*Zephranthyes* sp.) and umbrella-sedges (*Cyperus* sp.). Many marginal plants bear showy flowers and attractive foliage.

Most systems for growing plants in aquaria are structured for fully aquatic plants and require rooting of the plants in the substrate on the tank's floor (e.g., U.S. Pat. Nos. 4,114,316; 5,451,443; and 5,640,929). These supports are not suitable for growing marginal plants in aquariums. The foliage of the marginal plants, which are adapted to grow in the air, would be submerged in water. For many marginal species, this condition would cause the plant to languish and die. Conversely, filling the tank with water to a shallow depth would leave little underwater space for aquascape development or aquarium fish.

To avoid this problem, some aquarium or pond planters are structured to provide a planting substrate close to the water surface. These include bottom-supported plastic pond baskets or aquarium-specific devices that provide a support spanning the distance from the bottom of the aquarium to near the water surface (e.g., U.S. Pat. Nos. 5,957,084 and 6,618,989). These pond baskets and aquarium-specific devices are large and bulky. They consume much underwater space and crowd-out immersed plants or fish.

Other devices that provide a substrate close to the water surface include floating planters. These planters comprise cups or pots surrounded with buoyant material in a single unit, such as hydroponic devices, planter rafts, and floating plant islands (e.g., U.S. Pat. Nos. 2,531,562; 4,622,775; 6,751,903; 6,843,021; and 6,918,206 and U.S. Pub. Nos. 2003/0208954 and 2004/0187418). These designs conserve underwater space but consume space on the surface of the water and are visually obtrusive. In addition, as single, non-modular units, they do not easily accommodate plants of differing sizes or growth of plants over time.

A need exists for space-efficient, modular planters for marginal plants suitable for use in aquariums. This would allow for incorporation of marginal plants in aquarium displays while providing for a variety of possibilities for selection of plant species, fish species, and design options.

SUMMARY OF THE INVENTION

The present invention is directed to a marginals aquarium plant system comprising a hanging planter with openings to permit water movement that mounts to a vertical surface; and a trellis raft, for placement in front of or near the hanging planter, wherein the trellis raft comprises sections that form an asymmetrical latticework.

The present invention is further directed to a marginals aquarium plant system comprising a hanging planter with openings to permit water movement that mounts to a vertical surface; a trellis raft, floating in front of the hanging planter, wherein the trellis raft comprises sections that form an asymmetrical latticework; and an aquarium structure having a framework, including a front wall, a rear wall, and two side walls, wherein the planter is attached to the rear wall of the aquarium with a mounting device such as a suction cup or a sandwich magnet.

The present invention is further directed to a method of growing a marginal plant in an aquarium. The method comprises, in a first step, providing a hanging planter with openings to permit water movement; substrate within the planter; a nascent marginal plant rooted in the substrate; and an aquarium structure having a framework, including a front wall, a rear wall, and two side walls, wherein the aquarium structure is filled with water to a depth of about ⅓ to about ½ full and the planter is attached to the rear wall of the aquarium with a mounting device at a position about equal with the water depth. In a second step, the method includes adding one or more trellis rafts and/or floats to the aquarium to support stems of the marginal plant as the marginal plant grows.

The components of the marginals aquarium plant system described herein are designed such that they are visually unobtrusive in the aquarium, a feature in accordance with the natural aesthetics that aquarium gardeners seek to achieve. As the live plants grow in the marginals aquarium, these pieces quickly become obscured by spreading roots, stems, and foliage. This is a major distinguishing feature between the current system and some comparable devices that are currently used in ponds, which include large, bulky plastic and foam pieces that would be difficult to hide in an aquarium.

The marginals aquarium plant system described herein may engender the development of a distinct planted aquarium genre and new methods for growing aquatic plants. A number of benefits of the system are summarized in the following list:

1. Carbon dioxide available to plants through the air: All plants require carbon to build their tissues. Dissolved carbon dioxide is the carbon source used most frequently by aquatic plants. Carbon dioxide quickly becomes depleted in densely-planted, well-illuminated aquariums because the rate at which the gas is stripped from the water by the plants rapidly outpaces its replacement through biological processes and diffusion from the atmosphere. Aquarists usually resolve this dilemma through injection of pressurized $CO_2$, employing the same types of canisters used to carbonate beverages along with specially designed regulators and diffusers. While this technology is well-established and fairly easy to manage, its use represents additional expense and maintenance steps. In the marginals aquarium plant system described herein, carbon dioxide injection is not required because the foliage of the marginal plants is supported above water, where $CO_2$ is abundant.

2. Strongly-limited growth of nuisance algae: The bright illumination and fertilization used to sustain aquarium plants can also encourage the growth of nuisance algae. Under certain circumstances, the algae becomes so abundant that it impedes the growth of plants and creates unattractive conditions inside the aquarium. Experienced aquarists use a range of methods to favor the growth of the desired aquarium plants and inhibit algae growth; however, sustained control of algae growth is challenging. In the marginals aquarium plant system, much of the light emitted by lighting fixtures is intercepted by the plant foliage, and relatively less light therefore penetrates through the water for use by nuisance algae. Additionally, the vigorous growth of the marginal aquarium plants necessitates heavy nutrient uptake through their submerged roots, a process which constitutes another strong competitive pressure against algae.

3. Greater flexibility in livestock selection: Due to the chemical effects of dissolved carbon dioxide, $CO_2$-injected planted aquariums have acidic (pH 4.5-7) water conditions. Consequently, planted aquaria are usually stocked with acidophilic fishes, such as South American tetras (Characidae). Some popular aquarium fish, including many livebearers (e.g., Poecilidae) and African cichlids (Cichlidae), on the other hand, prefer neutral to slightly alkaline (pH 7-9) water. Because the marginals aquarium does not require $CO_2$ injection, the aquarist can accommodate the water chemistry preferences of a wider range of fish species.

4. Novelty in design options and plant selection: Aquarists are naturally inquisitive people, drawn to the multitude of creative and scientific questions that can be explored through development of model ecosystems. The marginals aquarium planting system will enable the aquarium culture of a large number of plants species that are not currently grown in the planted aquarium hobby. The combination of aerial and aquatic portions in the system described herein presents unique opportunities for garden design.

5. Modularity: The marginals aquarium plant system uses detachable hanging planters and floating trellis raft plant supports that are easily moved about in the aquarium, a feature that simplifies set-up, tear-down, pest control, and routine maintenance. By contrast, the terrestrial features in paludariums are generally permanent, especially where they are glued in place. In traditional planted aquariums, in which plants and other design elements are set directly into the plant substrate at the floor of the tank, the plant roots grow and become entwined with each other. This makes redesign of the initial configuration and maintenance of the tank difficult.

The objects and advantages of the invention will appear more fully from the following detailed description of the preferred embodiment of the invention made in conjunction with the accompanying drawings.

BRIEF DESCRIPTION OF THE DRAWINGS

FIG. 1C is a front perspective view of a hanging planter including a receiver hole.

FIG. 1D is a side perspective view of a hanging planter including a sandwich magnet on a bracket assembly and a liner.

FIG. 2A is a top perspective view of a trellis raft of the present invention with a round cross-section comprising an asymmetric latticework.

FIG. 2B is a top perspective view of a trellis raft comprising an asymmetric latticework.

FIG. 2C is a top perspective view of a trellis raft including substantially linear, parallel segments.

DETAILED DESCRIPTION OF THE INVENTION

Figure 1B:
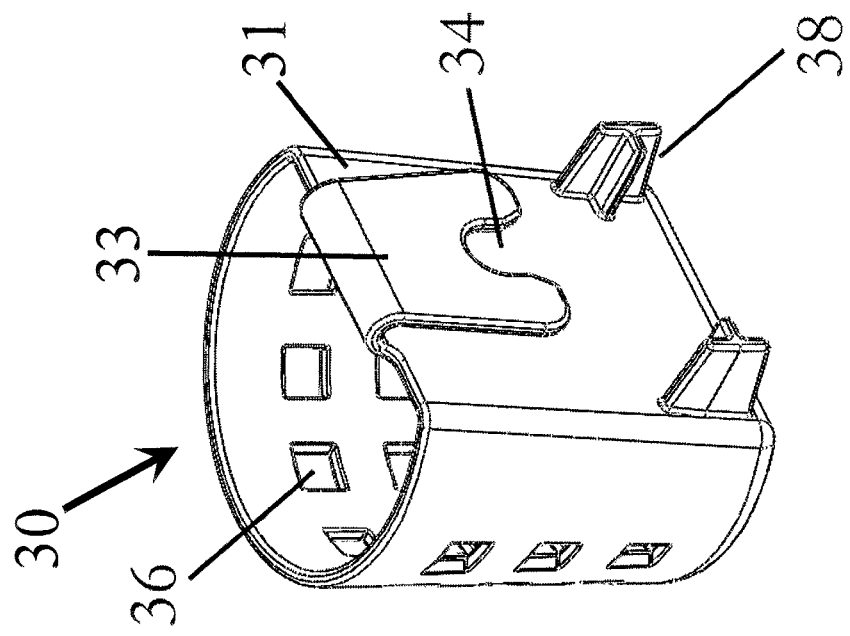
FIG. 1B is a rear perspective view of a hanging planter including a downward-facing notch on a bracket assembly.

FIGS. 1A-1D show various planters 30 of the present invention. The planter 30 is preferably made of clear, injection-molded polystyrene plastic but may be made of any other material with the ability to maintain structural integrity in water over periods of time. These materials may include other plastics, metals, organic-based materials, or mixtures thereof. The clear plastic is preferred as it is visually unobtrusive, but the planter 30 may be any color, especially those that blend-in with the design of the aquarium in which it is used.

The planter includes openings 36 in its sides to permit water movement. The openings 36 also permit plant roots to escape into the aquarium water, which helps to obscure the planter 30 from view, creates habitat for aquarium animals, and provides plants with greater access to nutrients.

The planter further includes a mounting device for mounting on a vertical surface, such as the side of an aquarium (FIG. 4A-5C). The mounting device may either be permanently or removably attached to the planter 30. The mounting device may include a suction cup 32 (FIGS. 1A and 1C), a sandwich magnet 60 (FIG. 1D), or any other device suitable for mounting the planter 30 to a solid, vertical surface. The sandwich magnet 60 includes an inner magnet 60A attached to the planter 30 and a separate outer magnet 60B (FIG. 1D). The planter mounts to a solid vertical surface by placing the inner magnet 60A against an inner portion of the surface and placing the outer magnet 60B on the corresponding position on an outer portion of the surface, such that the surface is "sandwiched" between the inner 60A and outer 60B magnets.

Figure 1A:
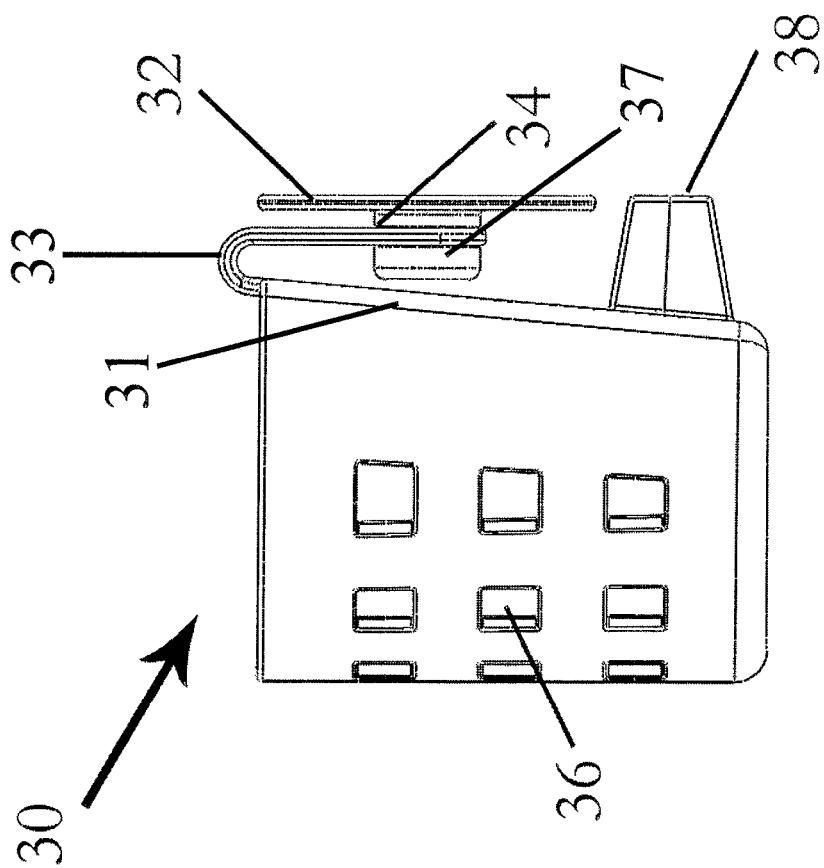
FIG. 1A is an elevated side view of a hanging planter of the present invention including a suction cup on a bracket assembly.

The planter 30 may also comprise a mounting-device receiver for removably attaching the mounting device on the planter 30. The mounting-device receiver facilitates easy placement and removal of the planter 30 by the aquarist. The mounting-device receiver may comprise a downward-facing notch 34 (FIGS. 1A and 1B) or a receiver hole 35 (FIG. 1C). The mounting devices and mounting-device receivers are coordinately dimensioned and configured for secure, reversible attachment. For example, the downward-facing notch 34 or receiver hole 35 may be configured to receive and securely fit around a neck 39 on the attachment device, as shown in FIGS. 1A and 1C for the suction cup. A head 37 on the attachment device, also shown in FIGS. 1A and 1C for the suction cup, ensures a tight fit of the attachment device in the attachment-device receiver. Although not shown, the inner magnet 60A of the magnet 60 may also contain a neck and head for attaching to the mounting-device receiver.

Some versions of the planter 30 include the mounting-device receiver directly on a rear portion 31 of the planter 30 (see receiver hole 35 in FIG. 1C). Other versions include the mounting-device receiver on a bracket assembly 33 that is attached to the rear portion 31 of the planter 30 (FIGS. 1A, 1B, and 1D).

Although not shown, the planter 30 may contain more than one mounting device and/or mounting-device receiver.

The planter 30 optionally includes a lining 62 (FIG. 1D) to prevent substrate from spilling through the openings 36 in the sides of the planter 30. The lining 62 contains holes 64 that are preferably smaller than the substrate granules used with the planter 30 but large enough to permit water infiltration. The lining 62 is preferably formed from a rectangular piece of polyester window screen. Other screen materials such as metal may be used.

The planter also optionally includes one or more stout pegs 38 at the base of the planter 30 (FIGS. 1A, 1B, and 1D). The pegs 38 rest against the vertical surface and maintain the planter 30 in a fully upright position when the planter 30 is mounted against the surface. Pegs 38 are preferably used in combination with a bracket assembly 33.

Although the planter 30 can have any dimensions suitable for uses described herein, a representative hanging planter 30 has the following dimensions:

| | |
|---|---|
| Height of planter 30 from bottom rim to top rim: | 3¼ inches (83 cm); |
| Diameter of planter 30 at widest point: | 3¼ inches (83 cm); and |
| Suction cup diameter: | 2⅛ inches (52 cm). |

Referring now to FIGS. 2A-2F, the present invention also includes a trellis raft 40 for placement in front of or near the planter 30 (see FIGS. 4A-5C for placement) for supporting the stems of marginal plants. Many marginal plants have sprawling, viny stems that reach from the shore toward the open water of the lake or stream. Among these are primrose creepers (*Ludwigia* sp.), water hyssop (*Bacopa* sp.), and frog-fruit (*Lippia nodiflora*). In an aquarium, where plants grow with less light and air movement than in natural settings, such plants develop flimsy stems. This condition causes much of the plant to become waterlogged and sink beneath the water's surface, presenting an unnatural appearance and leading to poor plant growth, degeneration of leaves, and general poor plant health.

Figure 2E:
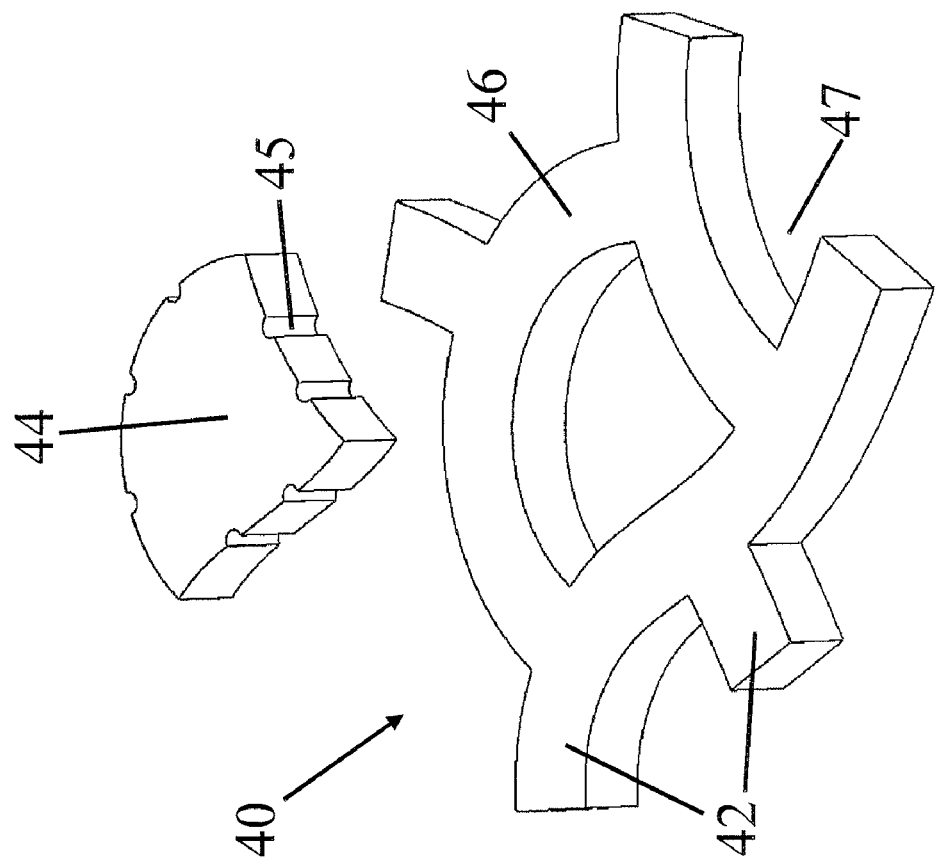
FIG. 2E is a top perspective view of a trellis raft including a removable insert with the insert removed.
Figure 2D:
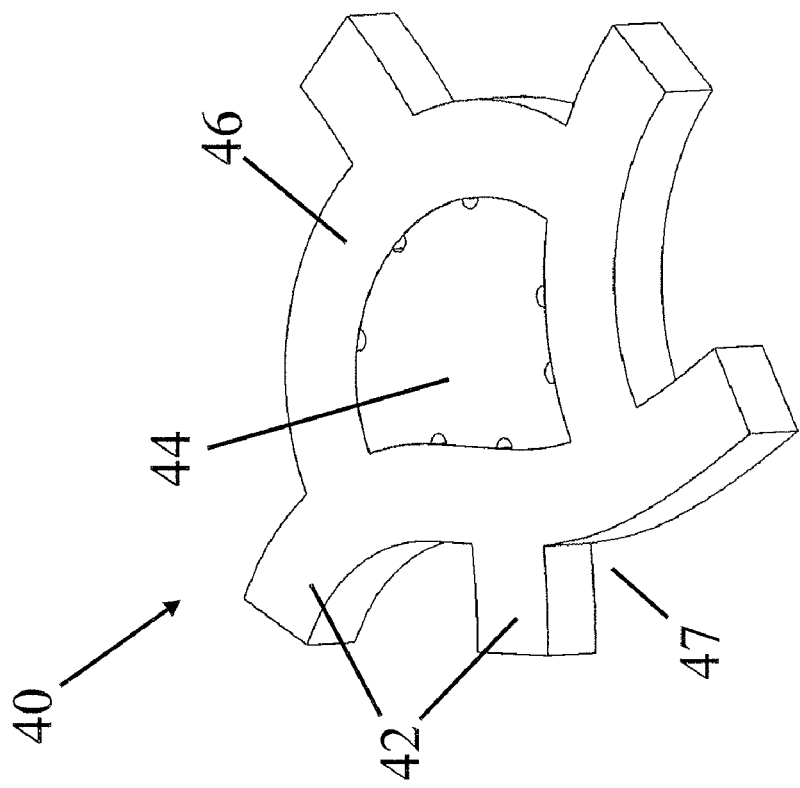
FIG. 2D is a top perspective view of a trellis raft including a removable insert.
Figure 2F:
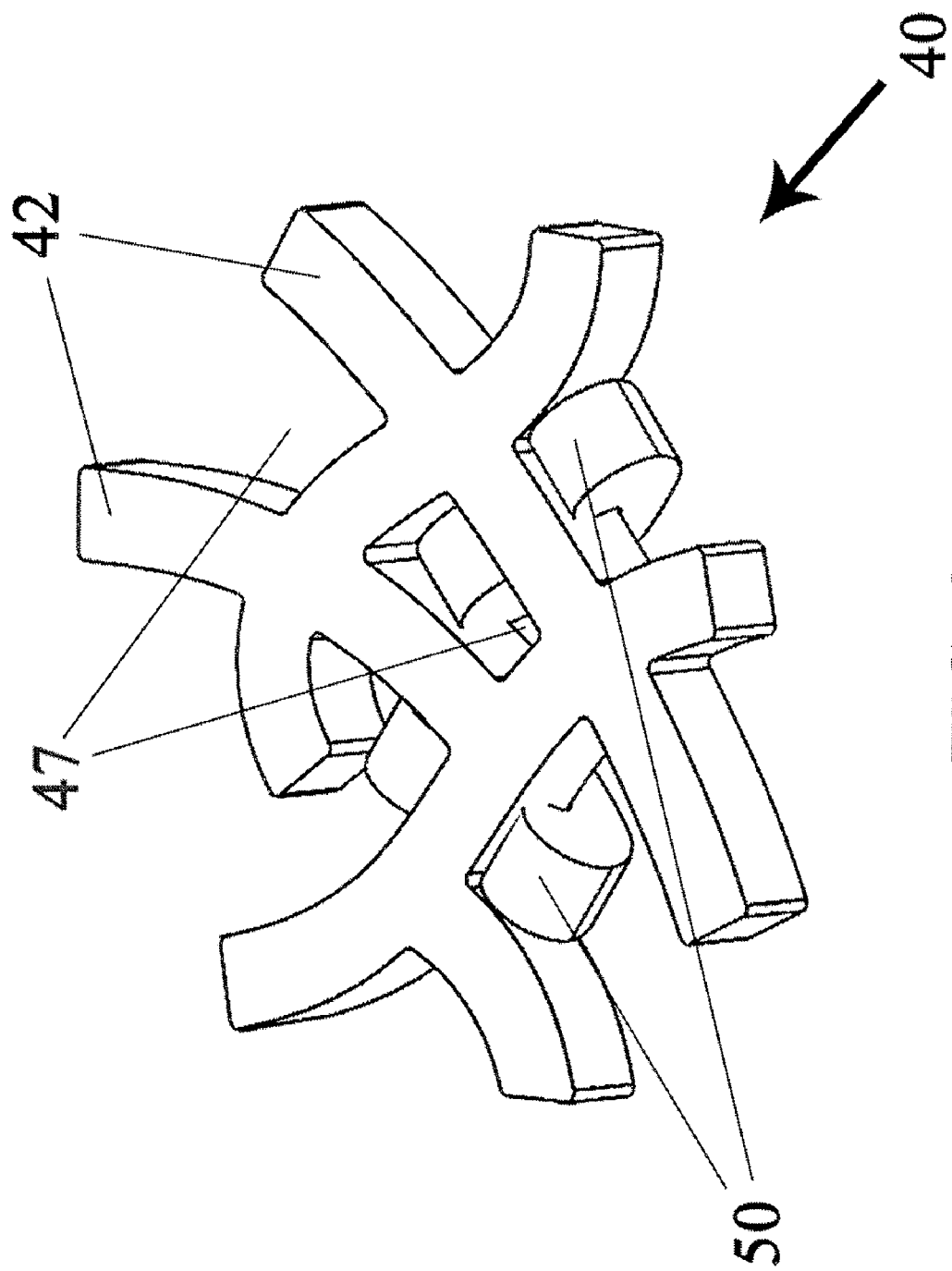
FIG. 2F is a top perspective view of a trellis raft including two telephone-shaped floats.
Figure 6A:
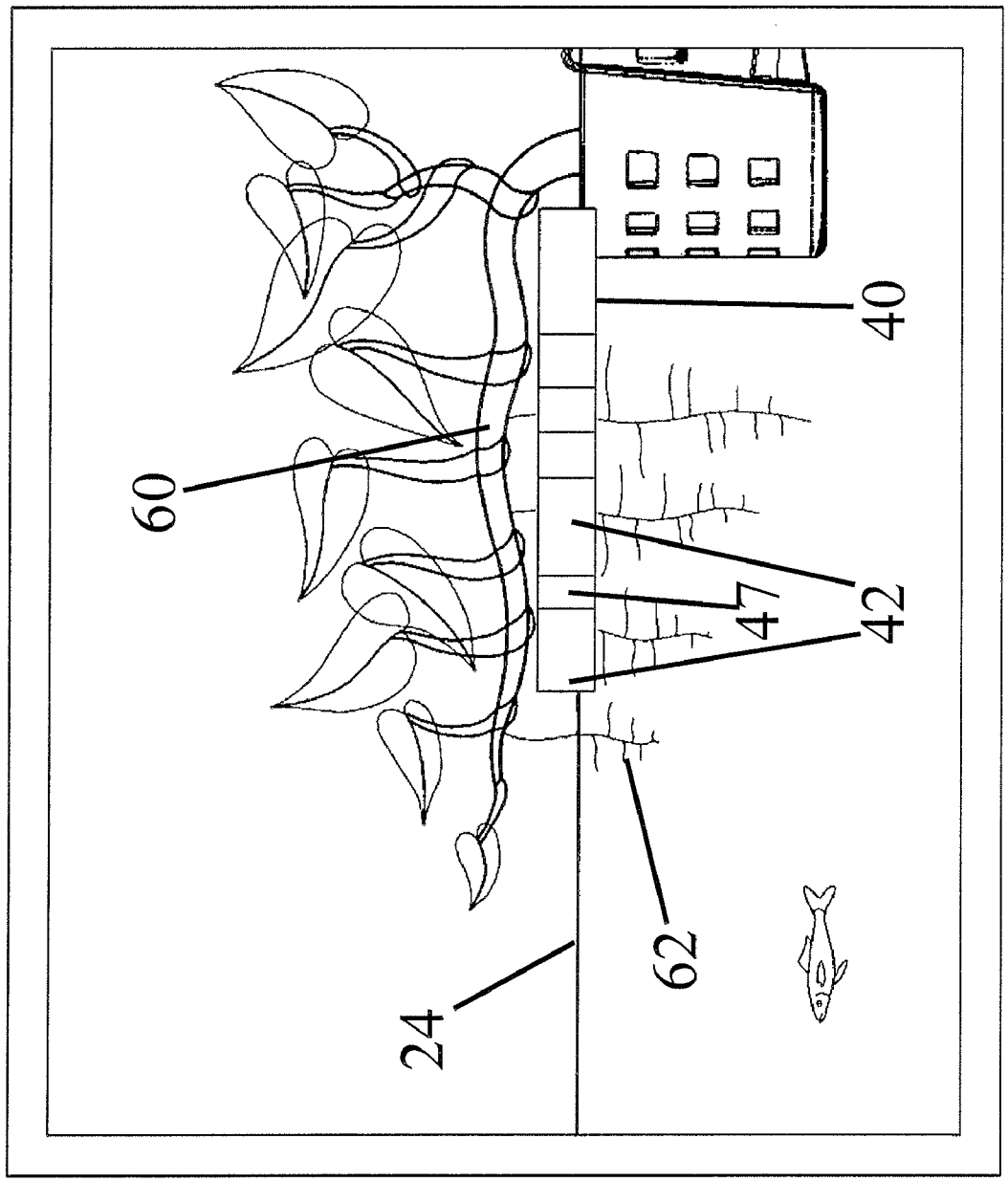
FIG. 6A is a side plan view of a trellis raft supporting the stems of a vining marginal plant rooted in a planter.

The trellis raft 40 of the present invention facilitates management of this group of marginal species. The trellis raft 40 is made of a buoyant material and can comprise a variety of different shapes and sizes, including, but not limited to, even latticework, asymmetrical latticework, honeycomb, and other symmetrical or asymmetrical shapes. The outer perimeter of the trellis raft roughly forms a disc-like shape. In the preferred version, the trellis raft 40 is wholly comprised of asymmetrical sections 42 that form an asymmetrical latticework (FIGS. 2A, 2B, and 2F). The asymmetrical sections 42 comprising the asymmetrical latticework define voids 47 between the sections 42 (FIGS. 2A-2F). As shown specifically in FIG. 6A, the asymmetrical sections 42 provide a moist surface for supporting stems 60 of plants on the water surface 24 and allow roots 62 emanating from the stems 60 to reach into the water through the voids 47.

Another version of the trellis raft 40 (FIG. 2C) includes asymmetrical sections 42 on the periphery of the raft 40 and further includes substantially linear, parallel segments 43 in the center of the raft. The substantially linear, parallel segments 43, as shown in the trellis raft 40 in FIG. 2C, for example, form a tight arrangement of foam segments in the center of the raft 40. This configuration increases buoyancy to better support the creeping rhizomes of, for example, *Anubias* sp. plants, which have thicker stems and are heavier overall. In this version, the asymmetrical sections 42 as well as the linear, parallel segments 43 form voids 47 through which adventitious roots can grow.

Figure 6B:
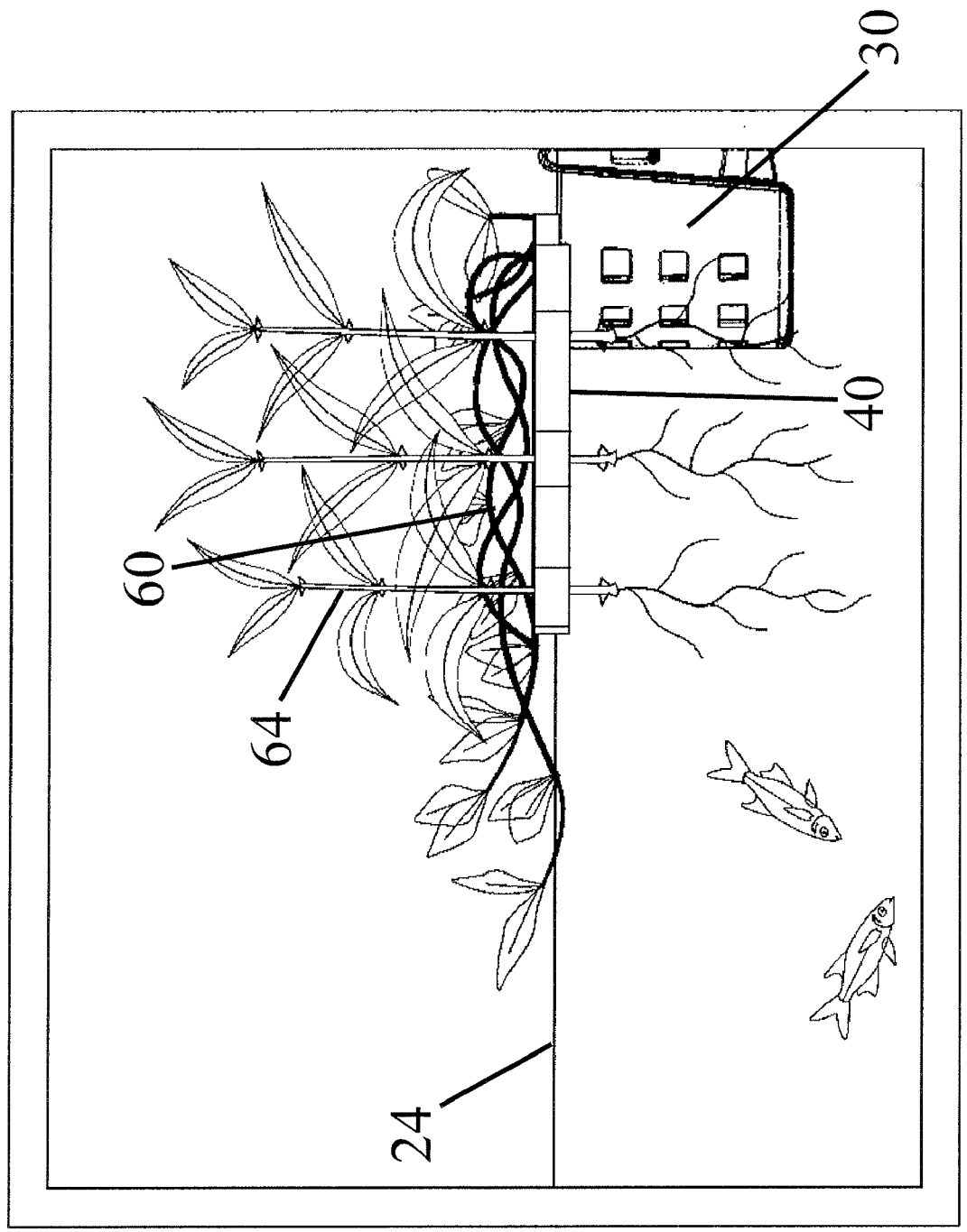
FIG. 6B is a side plan view of a trellis raft supporting both the stems of a vining marginal plant rooted in a planter and the stems of water-rooted plants.
Figure 6C:
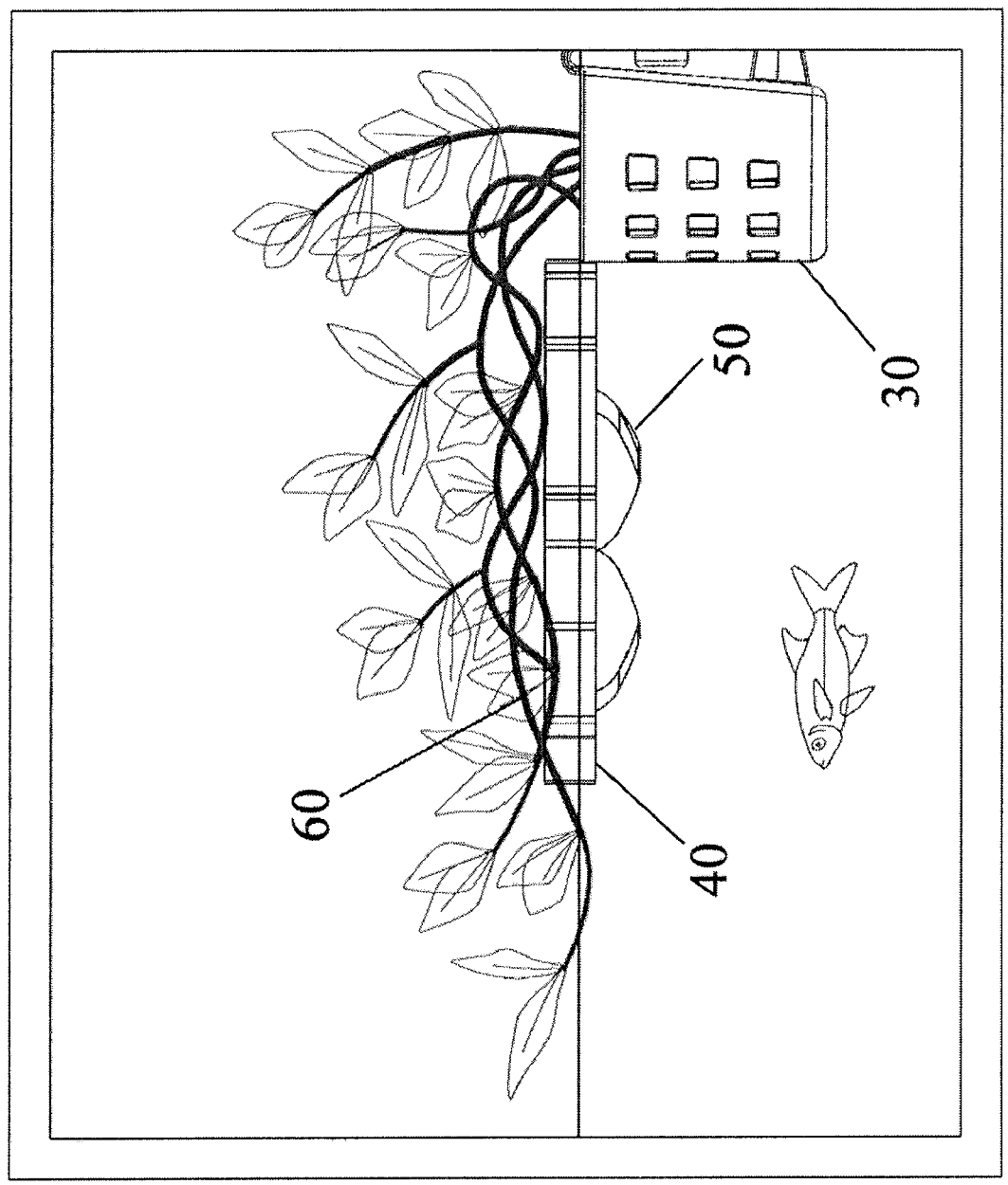
FIG. 6C is a side plan view of a trellis raft supporting the stems of a vining marginal plant rooted in a planter.

Yet another version of the trellis raft 40 includes asymmetrical sections 42 on the periphery of the raft 40 and further includes a removable insert 44 (FIGS. 2D and 2E) in the center of the raft. These rafts 40 are multi-functional. As shown in FIG. 6B, they have the capacity to hold the erect stems 64 of certain small marginal plants that root directly in the water, such as *Hemigraphis* sp., while also supporting the stems 60 of vining plants rooted in the hanging planter 30. This occurs by inserting the stems 64 of pre-sprouted, water-rooted plants in indentations 45 in the removable insert 44, securing the removable insert 44 in the body 46 of the raft 40, then placing the raft 40 in water near a vining plant in a planter 30 (see FIGS. 2D, 2E, and 6B).

The sizes and proportions of the trellis raft 40 and the hanging planters 30 can be varied in their manufacture to accommodate the range of sizes of different plants. For example, the trellis raft can be manufactured in small, medium, and large sizes. Additional modifications to these designs can accommodate the needs of specific plant species. Although the trellis raft 40 can have any dimensions suitable for uses described herein, a representative trellis raft 40 has the following dimensions:

| | |
|---|---|
| Approximate diameter: | 6.5 inches (16.5 cm); |
| Width of individual sections 42: | ⅝ inch (1.6 cm); |
| Depth: | ⅝ inch (1.6 cm). |

The trellis raft 40 is preferably made of 4-pound cross-linked polyethylene foam. The foam material is preferred, as it stays moist, which promotes adventitious root growth as the plant is supported on the water. The raft 40 may be cut from a flat sheet of foam (e.g., water jet cut or die cut) or cast in a mold. The mold-casting has the advantage of creating a more natural, organic-looking raft with the possibility of a rounded cross-section (FIG. 2A), but these versions have higher associated manufacturing costs. The raft 40 may also be molded from clear plastic into hollow structures.

The trellis raft 40 supports the plants as they sprawl forward from the planter 30, thus creating a more authentic semblance of the marginal aquatic habitat. Along with an asymmetric shape, a preferred gray color of the trellis raft 40 helps to camouflage the raft in the plant foliage and roots, making it difficult for an aquarium observer to become distracted by the raft 40. Cable ties can be used to secure the stems 60 of the plants to the trellis rafts 40 to "train" the stems 60 to grow on the raft 40. Alternatively, the stems 60 can be wedged into the voids 47 or simply draped across the top of the raft. This training allows for the adventitious roots to reach the water through the voids 47, which aids in the health of the plant by providing an additional water source and secures the stems 60 to the raft 40.

Figures 3A, 3B:
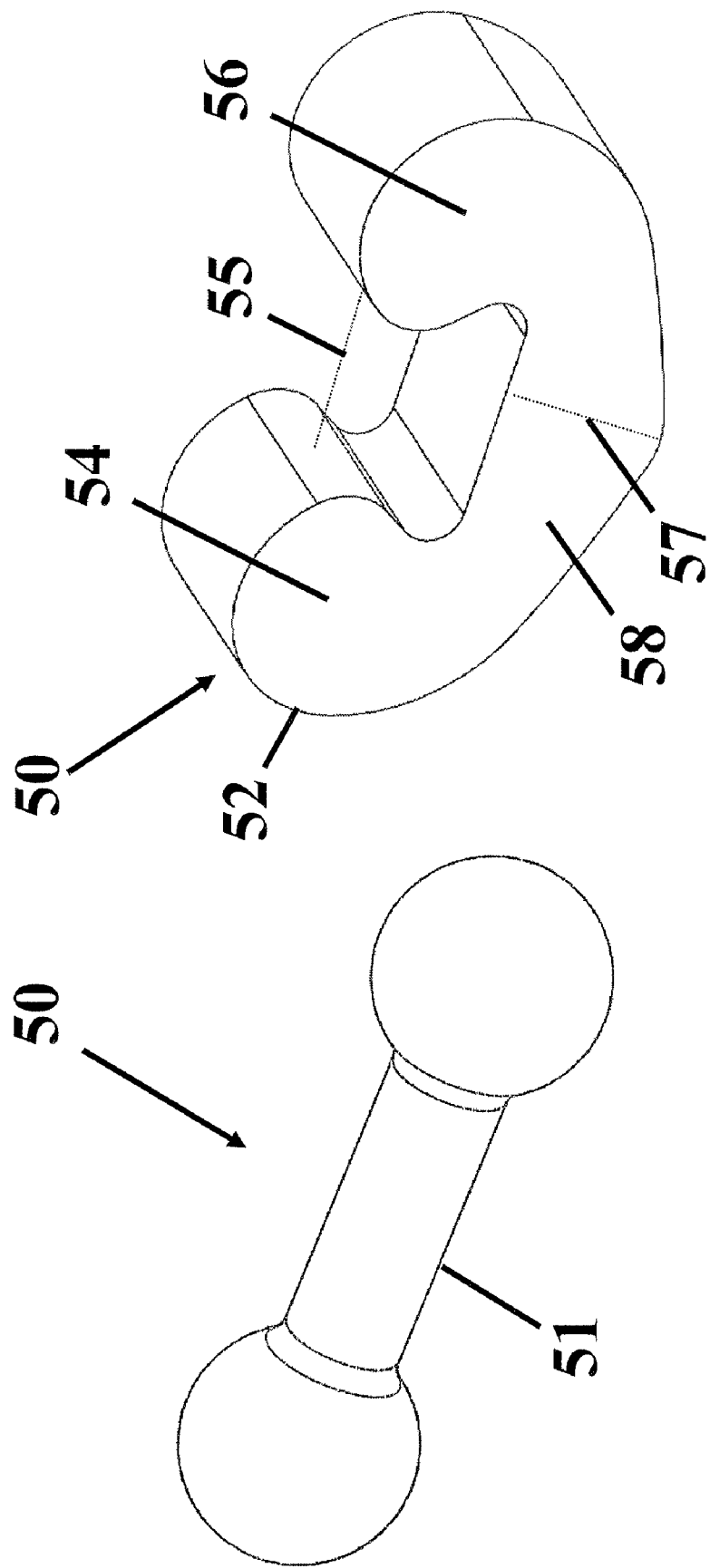
FIG. 3A is a perspective view of a dumbbell float of the present invention.
FIG. 3B is a side perspective view of a telephone-shaped float of the present invention.

Referring now to FIGS. 2F, 3A and 3B, the system described herein may further comprise floats 50. Depending upon nutrient availability and light, plants rooted in the hanging planter 30 and supported by the trellis raft 40 might grow vigorously. Consequently, the foliage can become so heavy that its weight begins to swamp the trellis raft 40. Floats 50, which are small, buoyant pieces, provide supplementary floatation. As shown in FIGS. 2F, 4A, 4B, 4D, 4E, 5A-C, and 6C, the floats are placed beneath the trellis raft 40 to support floatation. The floats 50 can be any configuration. Two exemplary versions are a dumbbell-shaped float 51 (FIG. 3A) and a telephone-shaped float 52 (FIG. 3B). The telephone-shaped float 52 is the preferred embodiment. The telephone-shaped float 52 includes an "earpiece" portion 54, a "mouthpiece portion" 56 and a "handle portion" 58 (FIG. 3B). A gap 55 (dotted line) between the earpiece portion 54 and the mouthpiece portion 56 is coordinately configured and dimensioned with the sections 42 of the trellis raft 40 to enable the telephone-shaped float 52 to hook on the segments 42 of the trellis raft 40, as shown in FIG. 2B. The width 57 (dotted line) of the handle portion 58 determines the degree of buoyancy afforded by the float 50.

The floats 50 are preferably made of 4-pound cross-linked polyethylene foam. They may be cut from a flat sheet of foam (e.g., water jet cut or die cut) or cast in a mold. The floats 50 may also be molded from clear plastic into hollow structures. Although the floats 50 can have any dimensions suitable for uses described herein, a representative telephone-shaped float 52 has the following dimensions:

| | |
|---|---|
| Total length of float 50: | 2 inches (5.1 cm) |
| Gap length 55: | ⅝ inch (1.6 cm) |
| Handle width 57: | ½ inch (1.3 cm) |
| Depth: | ½ inch (1.3 cm) |

Referring to FIGS. 4A-4E, the system 10 of the present invention may also comprise an aquarium structure 12 having a framework 14 typically made of glass walls, including a front wall 16, a rear wall 18, and two side walls 20, 22. In the version shown in FIGS. 4A-4E, a clear plastic hanging planter 30 is removably attached to the rear wall 18 of the aquarium 12 with a suction cup 32.

Figure 4A:
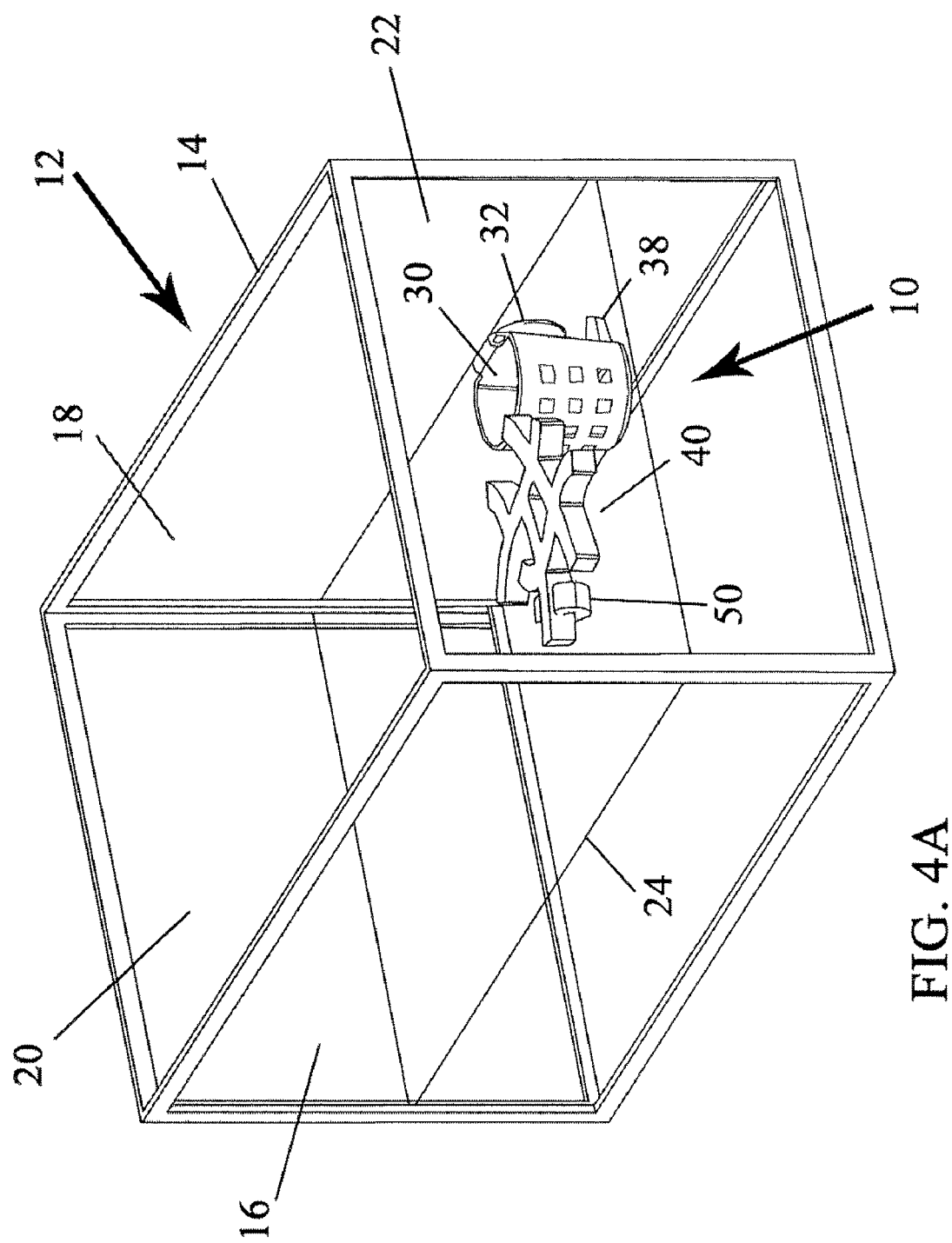
FIG. 4A is a side perspective view of a marginals aquarium system of the present invention including an aquarium.
Figure 4B:
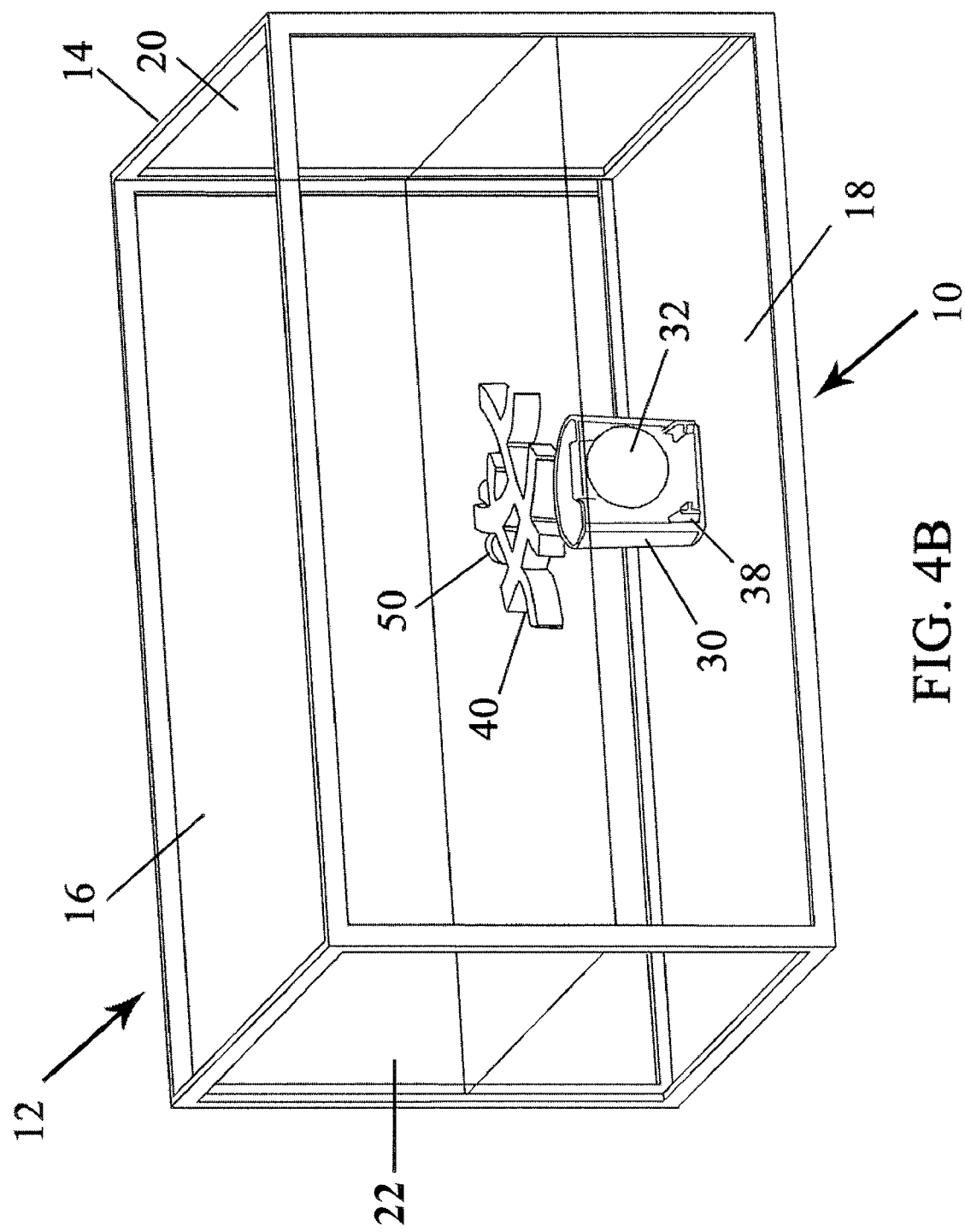
FIG. 4B is a rear perspective view of the system of FIG. 4A.
Figure 4C:
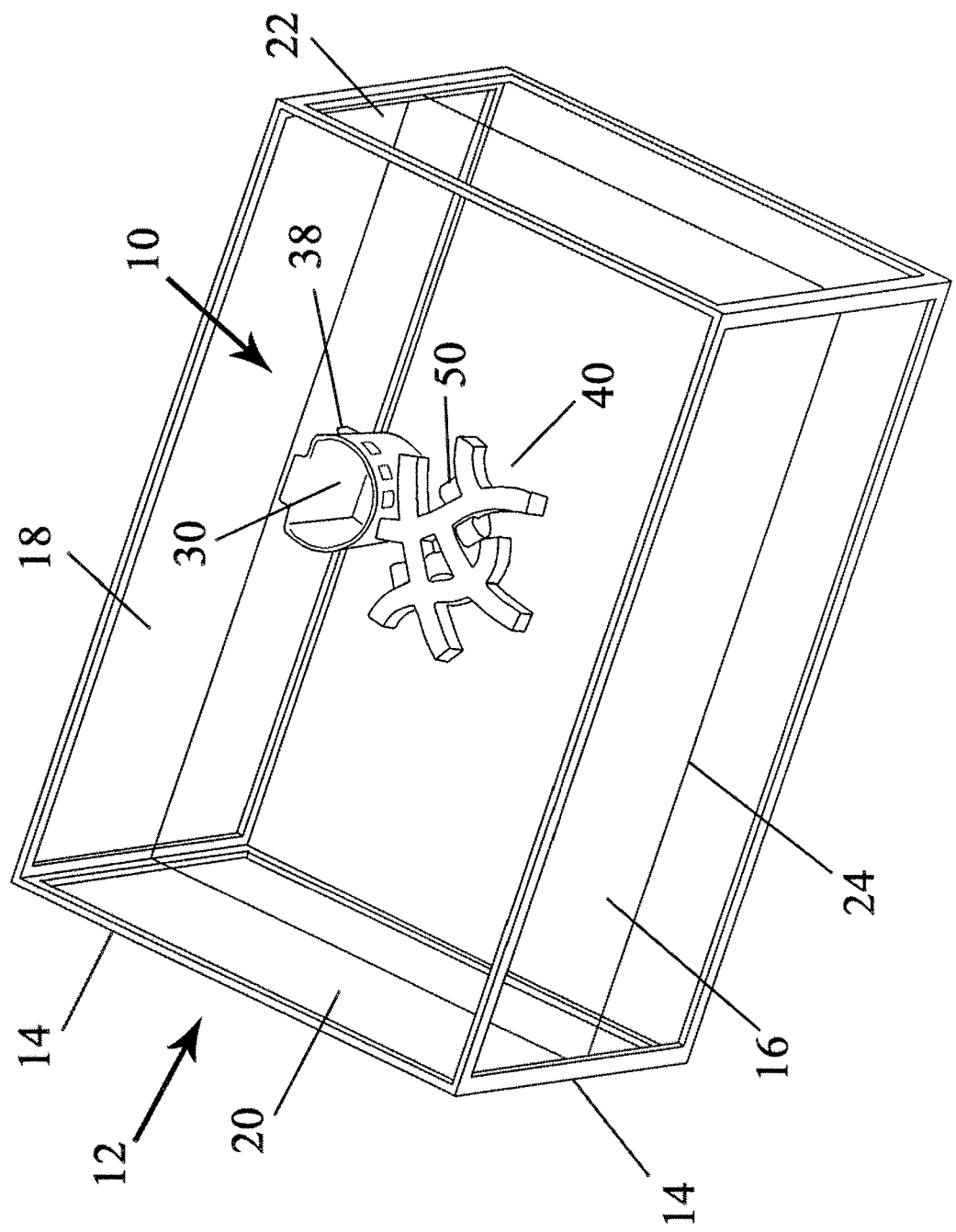
FIG. 4C is a top perspective view of the system of FIG. 4A
Figure 4D:
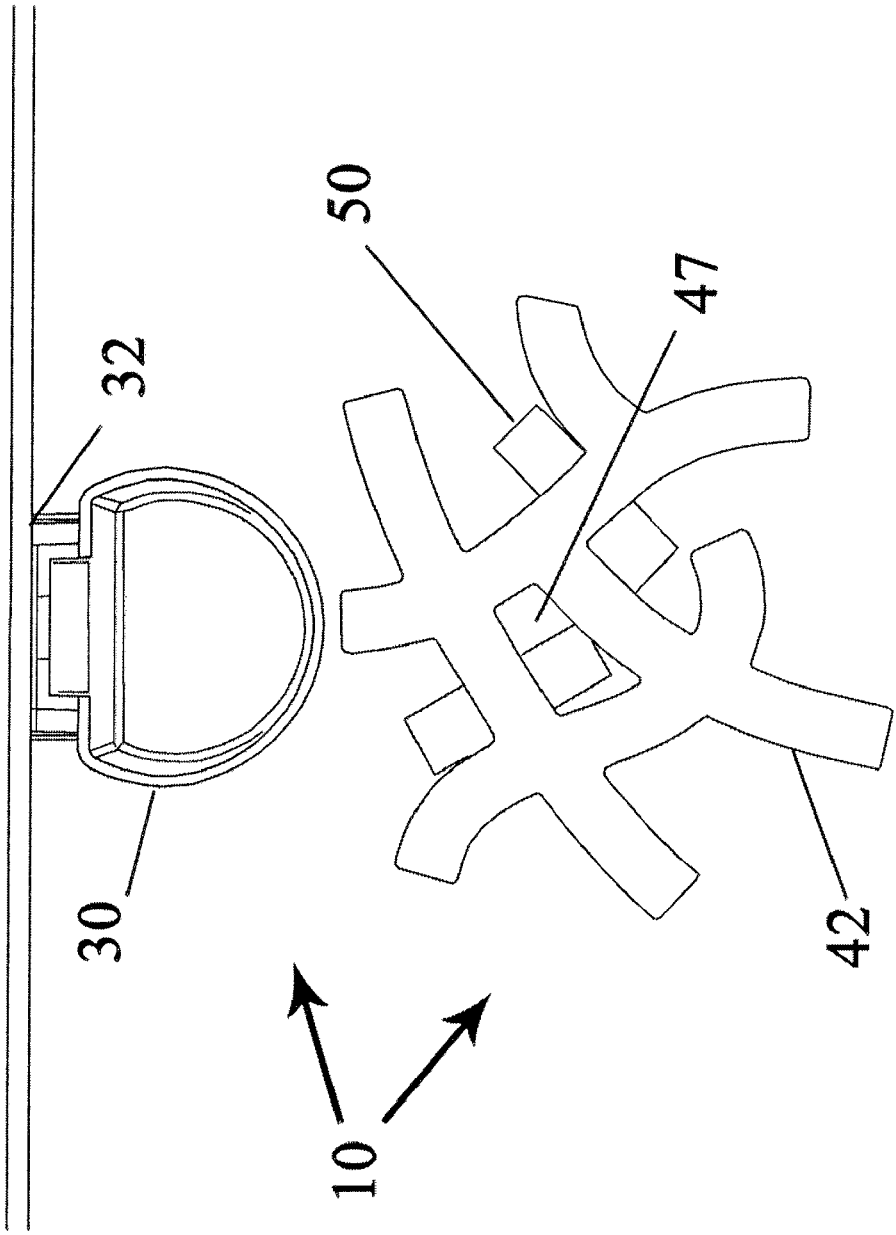
FIG. 4D is a top elevated view of the system of FIG. 4A.
Figure 4E:
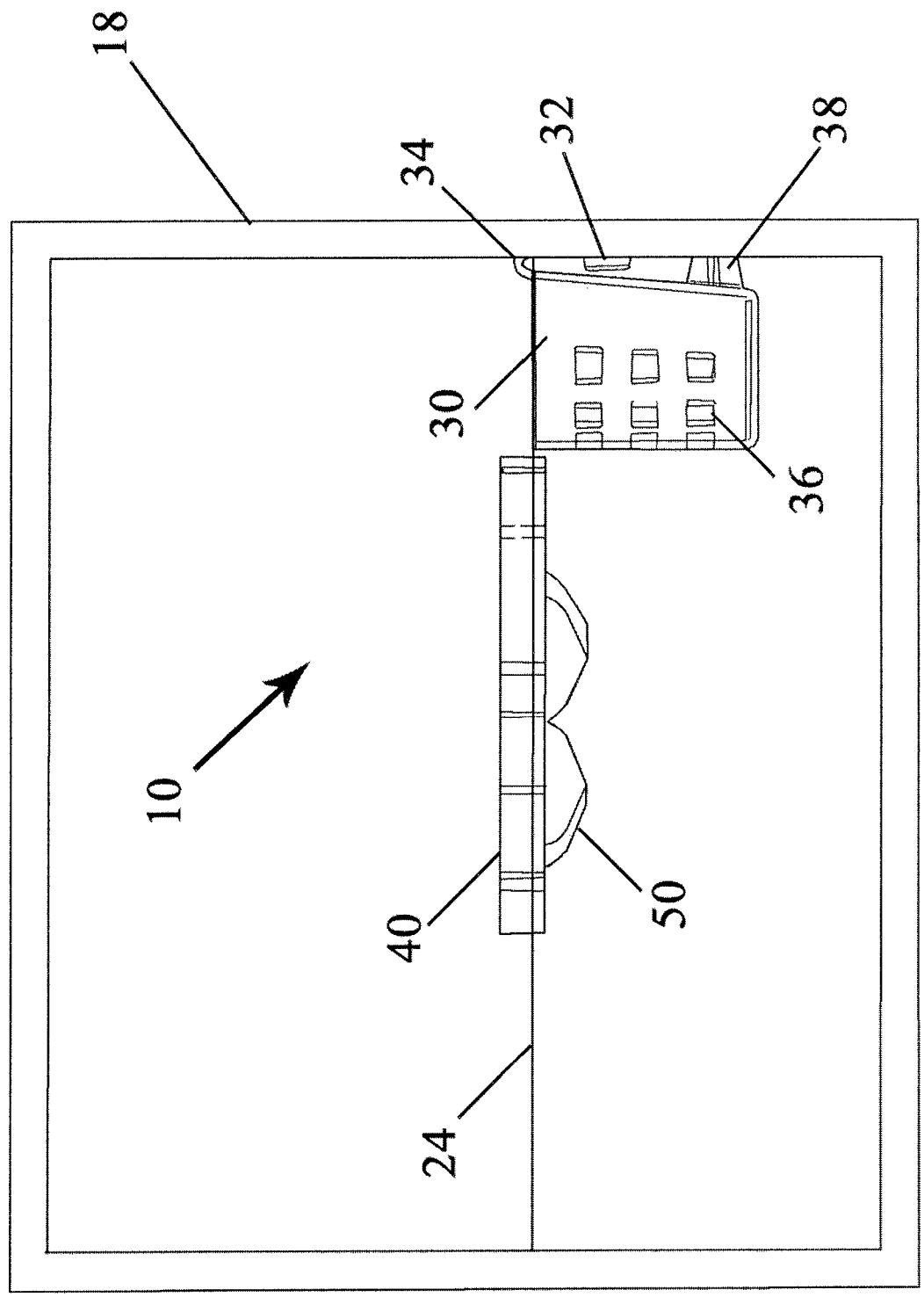
FIG. 4E is a side elevated view of the system of FIG. 4A.

Shown in FIGS. 4A-C and E is the surface level 24 of water in the aquarium 12. As illustrated, the aquarium is preferably filled with water from about ⅓ to about ½ of its total depth. Such levels allow for growth of the marginal plant stems upwards without extending beyond the top of the aquarium. If preferred by the aquarist, the aquarium can also be fully filled, allowing growth of the stems above the top of an open-topped aquarium. Regardless of the water level, the top rim of the hanging planter is positioned roughly equal with the water level, and the trellis raft floats on top of the water (FIG. 4E).

Figure 5A:
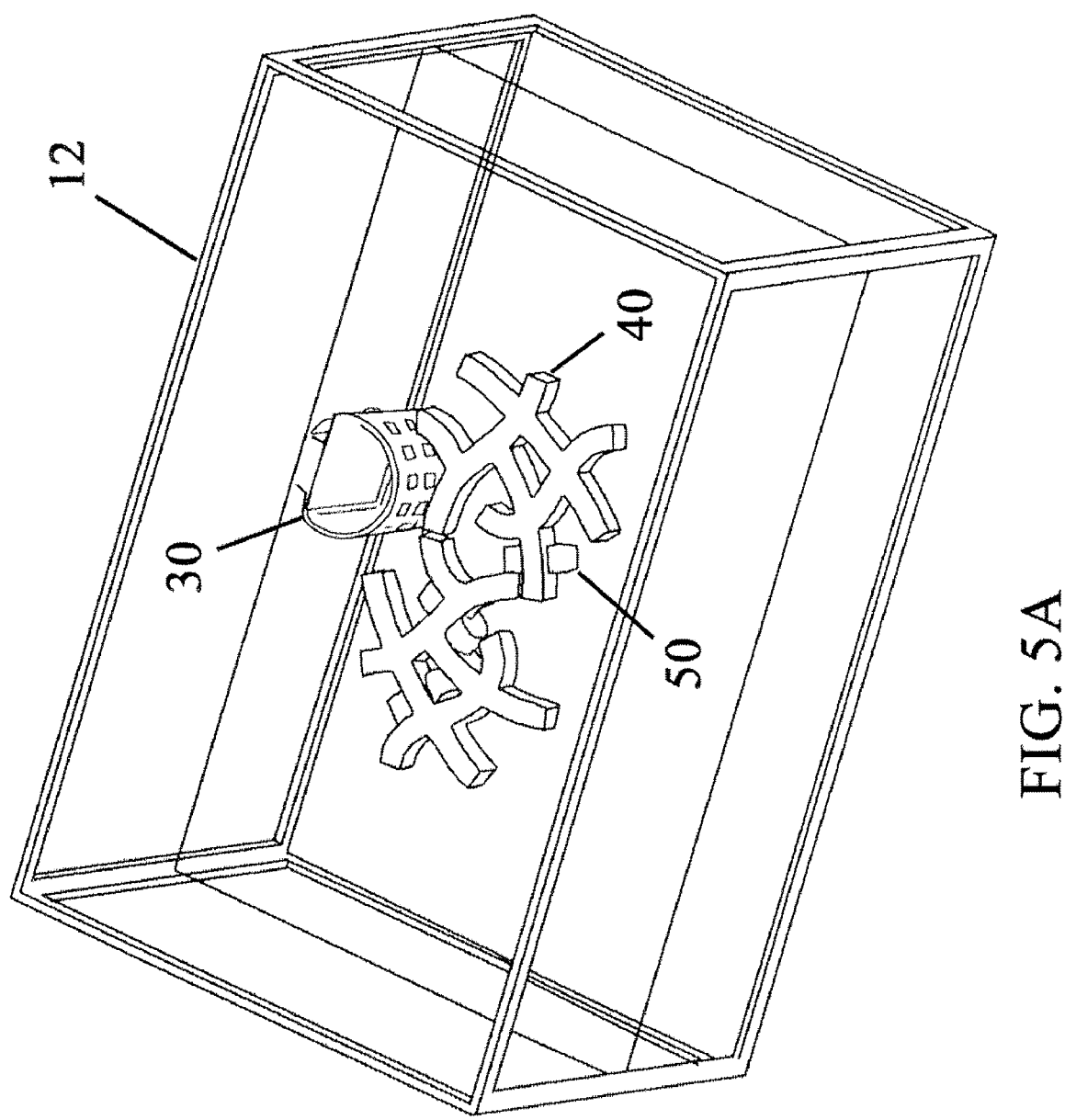
FIG. 5A is a top perspective view of an alternative embodiment of the present invention.
Figure 5B:
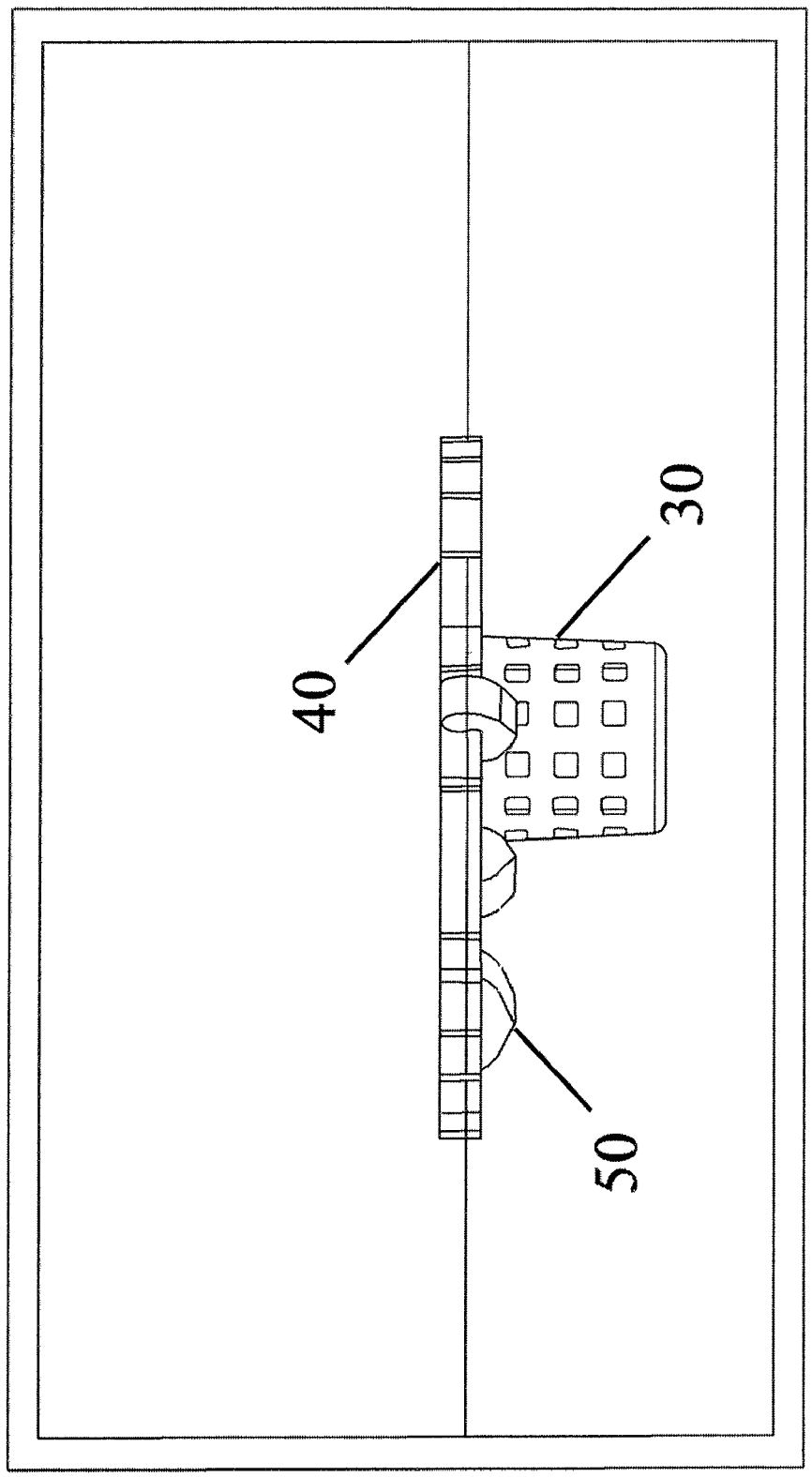
FIG. 5B is a front plan view of the embodiment of FIG. 5A.
Figure 5C:
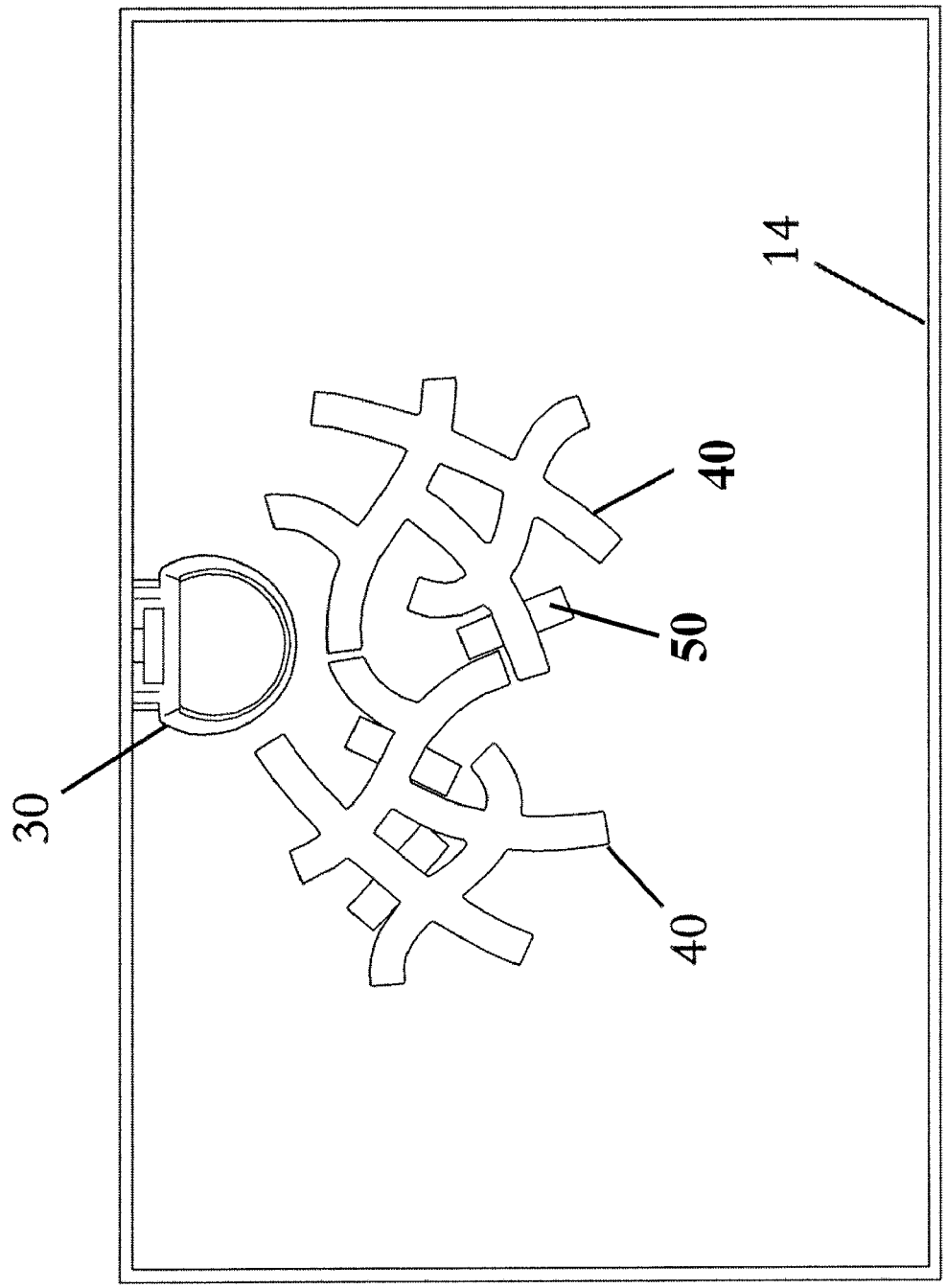
FIG. 5C is a top plan view of the embodiment of FIG. 5A.

Referring now to FIGS. 5A-5C, two, three or more rafts 40 can be combined with one planter 30 depending on the size and spread of the plant. For example, as the plants grow, it may be beneficial to add more than one trellis raft 40 per planter 30 (See also 2B). The modularity of the system, especially regarding the ability to add additional rafts as the plant grows, conserves space on the surface of the water, enabling growth of other plants or placement of other decorations.

When more than one trellis raft 40 is used, the rafts 40 may be tethered together. Rafts 40 may also be tethered to the planter 30. String, "VELCRO"-brand fastener (Velcro USA, Inc., Manchester, N.H.), or other fasteners may be used for tethering. However, depending on the turbulence of the water and weight of the stems supported by the rafts 40, tethering may not be necessary.

Any substrate that facilitates the growth of the plants may be used in the planter 30. The substrate preferably comprises granules that are larger than the openings 36 in the planter 30 and holes 64 in the lining 62 to prevent leakage. If a substrate with small granules is used, the openings 36 and lining 62 may be sized accordingly.

In test trials, Turface Pro League (Profile Products, LLC, Buffalo Grove, Ill.), a coarse-grained, clay-based soil amendment developed for athletic fields and popular for planted aquarium use, was used as a substrate for the hanging planter 30. Any of a number of similar proprietary aquarium products, such as Flourite™ (Seachem Laboratories Inc., Madison, Ga.) also work well. Water column fertilization was achieved mostly through heavy stocking of fish in the marginals aquarium. The animals' waste products provided most of the nitrogen and other nutrients needed by the plants. Iron, however, was limited in these test systems. Flourish Iron™ (Seachem Laboratories Inc.) was therefore dosed to the aquarium water as a response to this deficiency.

The systems described herein also provide methods of growing a marginal plant in an aquarium. The methods comprise at least two steps. One version of the first step comprises providing: a hanging planter with openings to permit water movement; substrate within the planter; a nascent marginal plant rooted in the substrate; and an aquarium structure having a framework, including a front wall, a rear wall, and two side walls, wherein the aquarium structure is filled with water to a depth and the planter is attached to the rear wall of the aquarium with a mounting device at a position about equal with the water depth. In another version of the first step comprises the step as listed above but further comprises filling the aquarium structure with water to a depth of about ⅓ to about ½ full.

A second step includes adding one or more trellis rafts and/or floats to the aquarium to support the stems of the marginal plant as the plant grows. The number of trellis rafts should be proportional to the surface area consumed by the laterally-growing stems of the plants. It is preferred that the trellis rafts underlie approximately 90% of the surface area consumed by the stems and leaves of the plant such that the majority of the outgrown plant portions are supported. In such a configuration, the trellis raft is completely covered by the plant. Other proportions, however, may be used. The number of floats used is dependent on the weight of the outgrown plant portions relative to the buoyancy of the trellis rafts and any added floats. The outgrown plant portions are preferably supported just above the surface of the water. This enables adequate access of the plant to carbon dioxide in the air and obviates the need to supplement water with an additional source of carbon dioxide.

Any variations of the elements of the system described above may be used in this method.

It is understood that the invention is not confined to the particular construction and arrangement of parts herein illustrated and described, but embraces such modified forms thereof as come within the scope of the following claims.

What is claimed is:

1. A marginals aquarium plant system, comprising:
   a. a hanging planter with openings that mounts to a vertical surface;
   b. a trellis raft, floating in front of the hanging planter, wherein the trellis raft comprises sections that form an asymmetrical latticework; and
   c. an aquarium structure having a framework, including a front wall, a rear wall, and two side walls, wherein the planter is attached to the rear wall of the aquarium with a mounting device selected from the group consisting of a suction cup and a sandwich magnet.

2. The system of claim 1 wherein the planter further comprises a mounting-device receiver for receiving the mounting device selected from the group consisting of an open, downward facing-notch, and a receiver hole.

3. The system of claim 2 wherein the planter further comprises a bracket assembly containing the mounting-device receiver.

4. The system of claim 1 wherein the planter comprises a peg on a base of the planter to maintain the planter in an upright position against the vertical surface.

5. The system of claim 1 wherein the planter further comprises a lining to prevent substrate from spilling through the openings in the planter.

6. The system of claim 1 wherein the trellis raft is comprised of a material selected from the group consisting of closed-cell foam and hollow plastic tubing.

7. The system of claim 1 wherein the trellis raft further comprises substantially linear, parallel segments or a removable insert.

8. The system of claim 1 further comprising a telephone-shaped float for supplementary floatation.

* * * * *